Patented Jan. 19, 1954

2,666,779

UNITED STATES PATENT OFFICE 2,666,779

PRODUCTION OF PHOSPHORUS ESTERS FROM HYDROPEROXIDE

Max Marin Wirth and Wilfred John Oldham, Sunbury-on-Thames, England, assignors to Anglo-Iranian Oil Company Limited, London, England, a British joint-stock corporation No Drawing. Application April 14, 1951, Serial No. 221,116

21 Claims. (Cl. 260—461)

This invention relates to an improved process for the production of phosphorus containing organic compounds.

More particularly this invention relates to the production of oxy-phosphoryl dichlorides and organic phosphates.

It is an object of this invention to provide a novel process for the production of phosphorus containing organic compounds utilising, as reactants, a class of compound not hitherto employed for this purpose. It is a further object to provide a process whereby phosphorus containing esters and oxy-phosphoryl chlorides are readily obtained from hydrocarbon containing materials.

According to the invention, phosphorus-containing organic compounds are produced by reacting an organic hydroperoxide or a salt thereof with an inorganic compound of phosphorus, said compound of phosphorus being capable of conversion, under oxidising conditions, to a compound of phosphorus in which compound the phosphorus is present in a higher valency state than initially.

The organic hydroperoxide may contain substituent groups, for example halo-, ketonic- or carboxylic- groups, upon the hydrocarbon radical. For the production of di-esters, the hydroperoxide of an ester may be treated according to the process of the invention.

In general, however, unsubstituted hydrocarbon hydroperoxides and particularly those of at least five carbon atoms per molecule are preferred. Compounds of considerable molecular weight, for example having ten or more carbon atoms per molecule are suitable. Alkyl and naphthene hydroperoxides have been found very suitable and the invention is described hereinafter with particular reference to hydroperoxides of this type. In general secondary hydroperoxides are preferred to tertiary hydroperoxides, yields on reaction according to the invention being usually higher when secondary hydroperoxides are employed.

Phosphorus compounds particularly preferred for use in the process are lower halides, for example phosphorus trichloride.

If desired, the product obtained according to the invention may be treated with a neutralising agent, preferably with an oxide, hydroxide or carbonate of an alkali metal or alkali earth metal for the production of a salt of an acid phosphate ester.

The nature of the organic compound formed will be determined, upon the one hand, by the nature of the compound which is formed from the compound of the element in a lower valency state on oxidation and, upon the other hand, by the nature of the alkyl group or naphthene group of the hydroperoxide, the said group being, in general, to be found unchanged in the resulting organic compound.

When a halide (Ha) is employed as the source of the acid radical, the reaction may be represented by the equation:

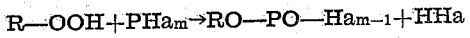

Thus using phosphorus trichloride the normal course of the reaction is:

whereby an oxy-phosphoryl dichloride is produced.

On hydrolysis with NaOH this compound reacts in the following manner:

Alkyl hydroperoxides and naphthene hydroperoxides are readily produced by the liquid phase oxidation of hydrocarbons by molecular oxygen or by other methods known in the art.

According to a further feature of the present invention esters are produced from paraffins, naphthenes or mixtures thereof by treating these materials with a gas consisting entirely or in part of molecular oxygen to form alkyl and/or naphthene hydroperoxides and thereafter treating the product or a refined product containing hydroperoxides or salts thereof with a phosphorus compound as hereinbefore described to form an alkyl and/or a naphthene ester.

The paraffins or naphthenes may be employed as pure chemicals or as any convenient naturally occurring or prepared mixture thereof. Distillation fractions of mineral oils such as petroleum, e. g. kerosine, gas oil or wax cuts have been found suitable. Other suitable oxidation feedstocks are hydrogenated oils from the Fischer Tropsch synthesis. Olefine containing materials such as wax cracking product fractions, shale oil fractions or crude hydrocarbon synthesis fractions may first be treated for the removal of olefines, for example, by conversion of the olefines to alkyl sulphates with sulphuric acid and the residue treated, if necessary for the removal of sulphur and thereafter subjected to oxidation and treatment in accordance with the present invention.

In general, the presence of sulphur compounds and aromatic compounds in the oxidation feedstocks is undesirable and if present in the mixture to be processed are preferably removed before the oxidation stage.

Preferably the paraffins and/or naphthenes are treated with oxygen or air to effect only a low conversion to oxygenated products. Thus, in general, the total proportion of paraffin and naphthene oxidised is less than 25% by weight and preferably 5–20% by weight.

The oxidation may be initiated by addition of a compound capable of forming active free radicals under the reaction conditions, for example organic peroxides such as tertiary butyl hydroperoxide or organic hypochlorites. Heavy metal catalysts (e. g. organic salts of cobalt or manganese) may also be used in the oxidation, but the proportion should be small (not more than 0.05% by weight and preferably not more than 0.01% by weight on the feed) if satisfactory yields of peroxides are to be obtained. If desired, a small proportion of the oxidation product may be employed to initiate the reaction of subsequent batches of the oxidation feedstock. Alternatively the reaction may be carried out in continuous manner.

If desired the oxidate may be treated for the concentration of the hydroperoxides before treatment according to the invention. According to one method of concentration, the oxidate is subjected to distillation, usually at reduced pressure, for the removal of at least part of the unreacted hydrocarbon. This method is preferably applied only to relatively volatile feedstocks, for example, having less than 12 carbon atoms/molecule, since with less volatile feedstocks appreciable decomposition of the hydroperoxides may occur, owing to the higher distillation temperatures required.

According to another method of concentration, the oxidate is extracted with a polar solvent, such as for example, methanol, ethanol or higher alcohols containing up to four carbon atoms, glycols, or "Cellosolve" and the hydroperoxide concentrate recovered from the extract by distilling off the solvent, preferably at reduced pressure. Alternatively the extract may be diluted with an aqueous medium to throw the hydroperoxide out of solution.

In addition to these physical methods it is possible to concentrate the perodixes chemically. If the crude oxidate is treated with alkali until it is neutral to phenolphthalein, carboxylic acids and only minor amounts of peroxide are extracted into the aqueous layer. Using a large excess of alkali on the oxidate either before or after such removal of carboxylic acids the hydroperoxides may be extracted and recovered as a concentrate by subsequent acidification of the aqueous alkali extract, the efficiency of the process being dependent on the nature of the peroxide present.

Unoxidised hydrocarbons, recovered in the concentration of hydroperoxide, may be recycled to the oxidation stage.

The reaction of the hydroperoxides according to the invention may be carried out using the whole of the oxidation product. If preferred the oxidation product may be treated with aqueous alkali, for example caustic soda or alkali carbonates, in sufficient quantity and strength to remove the organic acids contained therein before reaction according to the invention. Alternatively, the organic acids may be retained to form a constituent of the final product.

The following manner of operation is suitable for the production of phosphate esters. Phosphorus trichloride is added slowly to a cooled solution of the hydroperoxide or hydroperoxides in an inert solvent which will not react with phosphorus trihalides. An exothermic reaction with the evolution of hydrogen chloride takes place. When the reaction is complete excess aqueous caustic soda is added with stirring. An aqueous layer is separated and is acidified with hydrochloric acid. A brown oil, containing the acid ester is separated, extracted with ether, the ethereal solution washed with water, neutralised with aqueous caustic soda and the aqueous solution obtained is evaporated to dryness. Preferred solvents are organic nitrogen-containing bases, particularly pyridine. In the presence of pyridine a product is obtained which is much lighter in colour than the product obtained in its absence.

Our invention is illustrated but in no way limited by the following examples.

*Example 1*

Three hundred parts of kerosine oxidate containing 7.2% by wt. of peroxides estimated as hydroperoxide of molecular weight 200; and having an acid value of 0.5 milligram of KOH/gram was cooled to 0–5° C. and 10 parts of phosphorus trichloride added gradually. Heat was evolved and hydrogen chloride liberated. After standing for 1 hour, excess 5% aqueous caustic soda was added with stirring. The aqueous layer was separated and acidified with hydrochloric acid. The brown oil which separated was extracted with ether and washed with water. This ether solution of the free acid was then neutralised with aqueous caustic soda and the solution of sodium salts evaporated to dryness and the solid dried in vacuo at 90° C. 14 parts of brownish hygroscopic material were so obtained, giving a positive test with cetyl pyridinium bromide by the method described by S. R. Epton in Nature 160, 795 (1949). This material contained 8.8% by weight of phosphorus, present as organic phosphate. The material was very soluble in water and in organic solvents.

*Example 2*

A solution of 8.6 grams of phosphorus trichloride in 20 ccs. of petroleum ether was added slowly at about 20° C. to a mixture of 9.9 grams of pyridine and 47.6 grams of a kerosine peroxide concentrate containing 26.3% by weight of peroxides. The precipitated pyridine hydrochloride was filtered off and the filtrate recovered. This consisted of a solution, in pyridine and petroleum ether, of the compound:

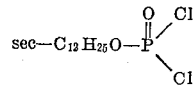

It will be apparent that by the process of the invention it is possible to obtain novel esters not obtainable by other methods or obtainable only with great difficulty. Furthermore it is possible to obtain many esters at present manufactured by tedious and expensive methods more efficiently than hitherto.

We claim:

1. A process for the production of an organic oxyphosphoryl dihalide which comprises reacting an organic hydroperoxide with a phosphorus trihalide.

2. A process for the production of an organic oxyphosphoryl dihalide which comprises reacting the hydroperoxide of an unsubstituted unsaturated hydrocarbon having, in the molecule, at least five carbon atoms with a phosphorus trihalide.

3. A process as specified in claim 2 in which the hydroperoxide is an alkyl hydroperoxide.

4. A process as specified in claim 2 in which the hydroperoxide is a naphthene hydroperoxide.

5. A process as specified in claim 2 in which the hydroperoxide is an alkyl substituted naphthene hydroperoxide.

6. A process as specified in claim 2 in which the hydroperoxide is a secondary hydroperoxide.

7. A process for the production of an organic oxy-phosphoryl dichloride which comprises reacting an organic hydroperoxide with phosphorus trichloride whereby an oxy-phosphoryl dichloride is produced.

8. A process for the production of an organic oxy-phosphoryl dichloride which comprises reacting the hydroperoxide of an unsubstituted saturated hydrocarbon having, in the molecule, at least five carbon atoms with phosphorus trichloride whereby an organic oxy-phosphoryl dichloride is produced.

9. A process as specified in claim 8 in which the hydroperoxide is an alkyl hydroperoxide.

10. A process as specified in claim 8 in which the hydroperoxide is a naphthene hydroperoxide.

11. A process as specified in claim 8 in which the hydroperoxide is an alkyl substituted naphthene hydroperoxide.

12. A process as specified in claim 8 in which the hydroperoxide comprises the group —OOH directly connected to a carbon atom, said carbon atom being directly connected to two carbon atoms.

13. A process as specified in claim 8 in which the hydroperoxide is a product of the partial, aerial oxidation of a petroleum distillation fraction.

14. A process for the production of an organic oxy-phosphoryl dichloride from hydrocarbons, which comprises treating a paraffin having at least five carbon atoms with a gas consisting at least in part of molecular oxygen, whereby alkyl hydroperoxides are formed and thereafter treating at least part of the product, containing the alkyl hydroperoxides with phosphorus trichloride to form an organic oxy-phosphoryl dichloride.

15. A process for the production of a naphthene oxy-phosphoryl dichloride from hydrocarbons, which comprises treating a naphthene with a gas consisting at least in part of molecular oxygen, whereby naphthene hydroperoxides are formed and thereafter treating at least part of the product, containing the naphthene hydroperoxides with phosphorus trichloride to form a naphthene oxy-phosphoryl dichloride.

16. A process for the production of organic oxy-phosphoryl dichlorides from hydrocarbons, which comprises treating a distillation fraction of petroleum with a gas consisting at least in part of molecular oxygen, whereby hydroperoxides are formed and thereafter treating at least part of the product, containing the hydroperoxides with phosphorus trichloride to form organic oxy phosphoryl dichlorides.

17. A process as specified in claim 16 in which the distillation fraction of petroleum is a gas oil.

18. A process as specified in claim 16 in which the distillation fraction of petroleum is a kerosine.

19. A process as specified in claim 16 in which the distillation fraction of petroleum is free of sulphur compounds and aromatic compounds.

20. A process for the production of an alkali metal salt of an acid phosphate ester which comprises reacting an organic hydroperoxide with phosphorus trichloride, whereby organic oxy-phosphoryl dichlorides are formed and reacting at least part of the product with an alkali metal hydroxide whereby an alkali metal salt of an acid phosphate ester is formed.

21. A process for the production of an alkali metal salt of an acid alkyl phosphate ester which comprises reacting an alkyl hydroperoxide with phosphorus trichloride, whereby organic oxy-phosphoryl dichlorides are formed and reacting at least part of the product with an alkali metal hydroxide whereby an alkali metal salt of an acid alkyl phosphate ester is formed.

MAX MARIN WIRTH.
WILFRED JOHN OLDHAM.

References Cited in the file of this patent

Chemical Abstracts, vol. 44, col. 1401 h (1950). Abstracting Soborovskic, Doklady Akad. Nauk S. S. R., vol. 67, pp. 293-5 (1949).

Clayton, J. Am. Chem. Soc., vol. 70, page 38, 80-82 (1948).